Jan. 10, 1939.　　　C. E. STEWART　　　2,143,115

DRIVE MECHANISM

Filed June 3, 1936

INVENTOR
Charles E. Stewart
BY
ATTORNEY

Patented Jan. 10, 1939

2,143,115

UNITED STATES PATENT OFFICE 2,143,115

DRIVE MECHANISM

Charles E. Stewart, Verdun, Quebec, Canada

Application June 3, 1936, Serial No. 83,319

4 Claims. (Cl. 74—189.5)

This invention rleates to the transmission of power from a prime mover to the wheels of an automobile and particularly to mechanism whereby an automatic variable speed transmission is provided.

Its object is to provide a novel means of driving a pair of wheels through a single axle and thereby eliminating the usual differential gear.

A further object is to provide an automatic transmission to each wheel including reduction gear and clutches to cut out the reduction gear.

A further object is to provide overrunning clutches to both high and low speed drives.

The invention comprises a single axle driven through a clutch from a prime mover, the axle having a gear box and clutch at each end for each wheel. In the gear boxes are reduction and reversing gear and in the wheels are automatic clutches co-operating with the gear.

Reference is made to the accompanying drawing in which.

Figures 1, 2, 3:
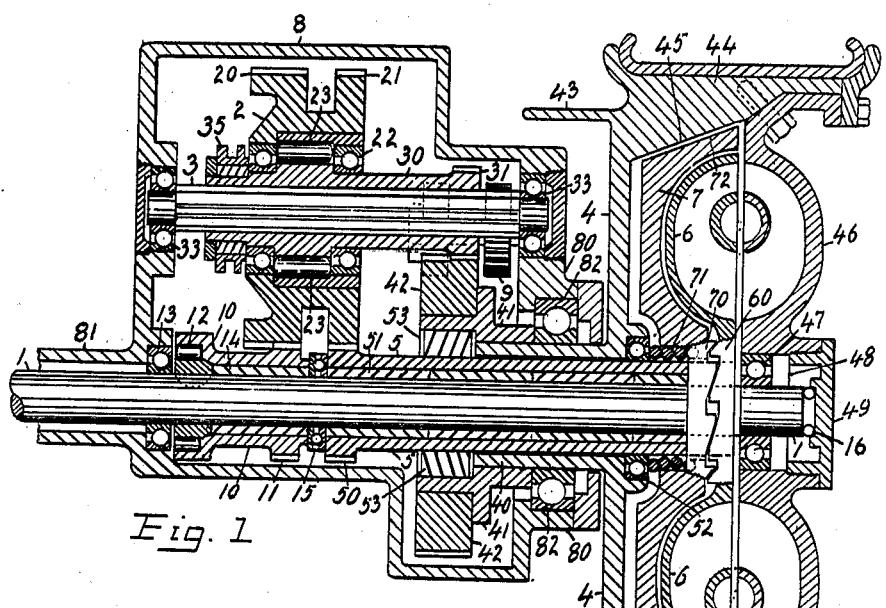
Figure 1 is a vertical section through the axis of the axle showing the mechanism of the right hand wheel.
Fig. 2 is a detail view of the fluid coupling connections.
Figure 3 is a plan view of the assembly.

The axle 1 is driven from a prime mover A through the usual clutch B, shaft C and suitable gear D.

The end of the gear box 8 from which the axle casing 81 extends is journalled on the axle 1 by bearing 13. Beyond this bearing a one way clutch 12 is keyed to the axle 1.

A sleeve 10 journalled at 14 on the axle 1 has a flange bearing on the clutch 12, and a pinion 11.

Journalled in bearings 33 in the gear box 8 is a countershaft 3 on which a sleeve 30 is splined. Bearings 22 on the sleeve 30 journal the double gear 2 and between the bearings 22 a one way clutch 23 is mounted to couple the sleeve 30 to the gear 2.

The sleeve 30 has a pinion 31.

A grooved ring 35 secured to the sleeve 30 provides means to slide the sleeve 30 on the splined countershaft 3.

One set of teeth 20 on the gear 2 are double the width of the pinion 11 with which they mesh.

Beyond the sleeve 10 is journalled on bearing 51 a sleeve 5. A thrust bearing 15 is mounted between the sleeves 10 and 5. The sleeve 5 has a pinion 50 meshing with the teeth 21 of the gear 2.

The disc 4 of the wheel has a sleeve 40 secured to a flanged ring 41.

These are journalled on the sleeve 5 by the bearings 52 and 53. A wide gear 42 is secured to the flange ring 41 and meshes with the pinion 31 of the sleeve 30 on the countershaft 3. The outer end 80 of the gear box 8 is journalled on bearing 82 on the sleeve 40.

Extending inwardly from the disc 4 is a brake drum 43 while outwardly is the tire seat 44.

Bolted to the seat 44 is the runner member 46 of a Fottinger fluid coupling journalled by bearing 47 on the end of the axle 1.

A screw cap 49 holds a thrust bearing 16 and an oil seal 48 in place.

The outer end of the sleeve 5 is splined and the driver member 6 of the fluid coupling mounted on the splines.

Within the wheel a coned surface 45 extends from the disc 4.

Mounted between the driver 6 and the disc 4 is a clutch member 7 having a coned periphery 72 to seat in the surface 45 of the wheel. The member 7 is loosely mounted on the sleeve 5. A coil springs 71 about the sleeve 5 presses the member 7 outwards to keep the cone clutch open.

Between the driver 6 and the member 7 are opposed inclined jaws 60 and 70, whereby the driver 6 can force the member 7 against the pressure of the spring 71 and cause the cone clutch to close.

To provide a reverse drive, a spindle journalled in the gear box 8 parallel to the countershaft 3 carries a gear in constant mesh with the gear 42 and an idler 9.

The pinion 31 can be moved to leave the gear 42 and mesh with the idler 9 by sliding the sleeve 30 on the splined countershaft 3 by means of the usual forked lever operating the grooved ring 35.

When this movement takes place the teeth 21 of the gear 2 leave the pinion 50 of the sleeve 5 and the driver 6 of the fluid coupling is not rotated. The reverse drive is therefore entirely through the reduction gear and at low speed.

While the form, as shown and described, of the clutch to cut out the low speed drive of the reduction gears, is a fluid coupling of the Fotting type. I do not limit my invention to this form. Centrifugal clutches operated by weights could be substituted for the fluid coupling.

The variation of the speed of rotation of the two wheels in turning or rounding a curve is provided for in the case of a low speed drive by tne overrunning clutch 23 on the sleeve 30 of the countershaft 3.

In the case of a drive at high speed the overrunning clutch 12 on the axle 1 will accommodate a variation in the speed of rotation of the two wheels.

In both cases the inner wheel becomes the drive wheel and the outer wheel can overrun the drive speed.

In starting and at low speed the drive from the axle to the wheel frame is through the double reduction gear. That is from the pinion 11 to the gear 2, and from the pinion 31 to the gear 42. The runner 46 is at the same speed as the wheel.

The driver 6 starts at axle speed and slips past the slow runner. As the fluid coupling gradually closes the speed of the runner increases and gradually cuts out the reduction drive, the sleeve 30 overrunning the gear 2.

The clutch member 7 is held by the coil spring 71 to free the cone 72 from the cone surface 45 till a predetermined speed is reached by the driver 6. By increasing the speed of the axle, the jaws 60 slide forward on the jaws 70 and force the member 7 outwards against the pressure of the spring 71 to close the cone clutch.

The drive is then at axle speed. As the speed decreases the reverse process takes place. The spring 71 opens the cone clutch and the slip between the driver and runner increases. The reduction drive is gradually cut in.

As these changes take place automatically and are brought about by the decreasing or increasing of slippage between the clutch members, there is no violent strain on the parts.

The control of the drive speed is by the accelerator and main clutch to the axle and the brake system.

While this invention is adaptable to the present assembly of a main shaft from the engine at the front of the chassis, it is especially suited to an assembly with the engine adjacent to the axle. Furthermore the weight of the gear boxes on the axle will tend to increase the traction of the tires. The elimination of differential gear will not only obviate skidding, but will prevent a car from being stalled by one wheel spinning in a mud hole.

What I claim is:—

1. Drive mechanism for automobiles comprising an axle driven through a clutch from a prime mover, wheels journalled on each end of the axle, gear boxes to each wheel journalled about the axle, a countershaft journalled in each gear box carrying reduction gear between the axle and the wheel, a one way clutch in the reduction gear, a fluid coupling of the Fottinger type having driver and runner members, the runner member secured to the wheel, the driver member connected to the axle, a clutch between the driver member and the wheel and a one way clutch between the axle and the driver member.

2. In a drive mechanism for automobiles, the combination of a prime mover, a main shaft, a clutch, bevel gear, an axle forming a single drive shaft, a fluid coupling of the Fottinger type having driver and runner members, a drive shaft coupled to a prime mover by a clutch, reduction gear between the drive shaft and the runner, including a disc with a coned surface around the driver, a sleeve journalled on the drive shaft splined to the driver, means to couple the sleeve to the drive shaft, a one way clutch in the reduction gear, a clutch member between the driver and the disc having a coned periphery, a coil spring to open the cone clutch and opposed spiral jaws between the driver and the clutch member, adapted to close the cone clutch.

3. In a drive mechanism for automobiles, the combination of a prime mover, a main shaft, a clutch, bevel gear, an axle forming a single drive shaft, a fluid coupling of the Fottinger type having driver and runner members, a shaft coupled to a prime mover by a clutch, a sleeve journalled on the shaft, the runner journalled on the shaft, the driver splined on the sleeve, a disc journalled on the sleeve having a coned surface secured to the runner, a bowled clutch member between the disc and the driver having a coned periphery, a coil spring between the disc and the clutch member, and opposed spiral jaws on the driver and the clutch member, adapted to close the cone clutch.

4. Drive mechanism for automobiles comprising an axle driven through a clutch from a prime mover, wheels journalled on each end of the axle, gear boxes to each wheel journalled about the axle, a fluid coupling of the Fottinger type having driver and runner members, the runner member secured to the wheel, the driver member geared to the axle through a one way clutch, reduction gear between the one way clutch and the wheel mounted in each gear box, an overrunning clutch in the reduction gear, and a clutch between the driver member and the wheel.

CHARLES E. STEWART.